Feb. 3, 1959 — C. W. NOCHES — 2,871,609

FISH LURE

Filed May 6, 1954

INVENTOR.
CHRESPIN W. NOCHES,
BY
Edwin Shur
ATTORNEY.

2,871,609

FISH LURE

Chrespin W. Noches, Pasadena, Calif.

Application May 6, 1954, Serial No. 427,985

8 Claims. (Cl. 43—42.06)

My invention relates to fish lures for use in casting or trolling, and it has for a purpose the provision of a lure so formed that its resistance to movement through the water causes it to describe a sinuous lateral motion in simulation of the swimming motions of a fish of commensurate size swimming at a comparable speed.

It is also a purpose of my invention to provide a lure which is particularly advantageous when casting for fish, since when cast it immediately rises to the surface of the water, and then slowly sinks, emitting air bubbles as it does in simulation of a fish rising to the surface for additional oxygen. In practice it has been found that such lure movements serve to attract fish to a high degree, and thus greatly aid in the catching of fresh water fish.

Another purpose of my invention is the provision of a lure which in addition to possessing the above described motion characteristics when cast and trolled, further enhances its fish luring ability by having the precise shape and appearance of a fish even to caudal and dorsal fins.

A further purpose of my invention is the provision of a lure which can be easily formed from plastic or other thin material, and molded in identical half sections to provide not only the precise shape and appearance of a fish, but an interior construction by which the aforedescribed motions thereof are obtained by casting and trolling.

I will describe only one form of fish lure embodying my invention and will then point out the novel features thereof in claims.

Referring more particularly to the drawings, the lure comprises a body B preferably made from plastic material and molded in two identical shell-like longitudinal sections $b$, $b$, which are bonded to each other at their flat confronting sides. The exterior of the body has the exact form and appearance of an open mouthed fish, the eyes 15, the gills 16, and the pectoral fins 17 being embossed on the surface of the body, and membraneous dorsal and caudal fins 18 and 19, projecting from the body.

Figure 1:
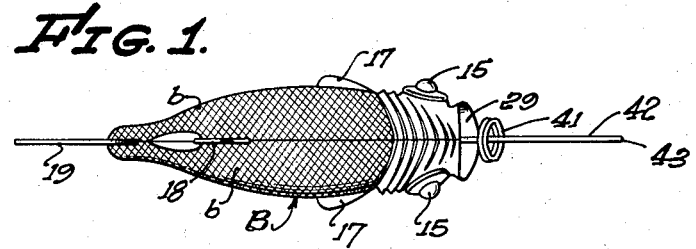
Fig. 1 is a view showing in top plan one form of fish lure embodying my invention.
Figure 2:
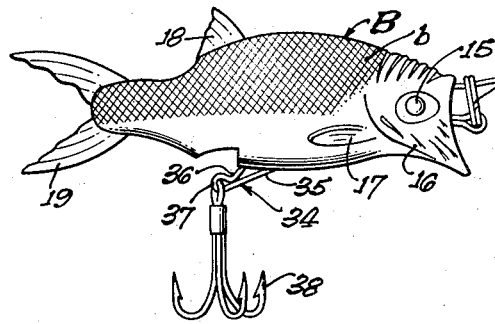
Fig. 2 is a view showing the lure in side elevation.
Figure 3:
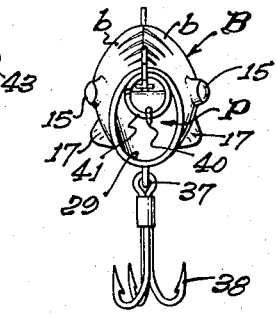
Fig. 3 is a view showing the lure in front end elevation.
Figure 4:
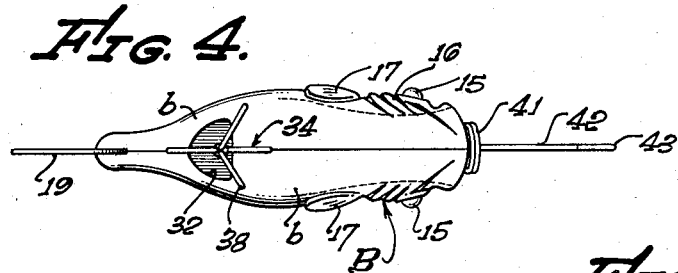
Fig. 4 is a view showing the lure in bottom plan.
Figure 5:
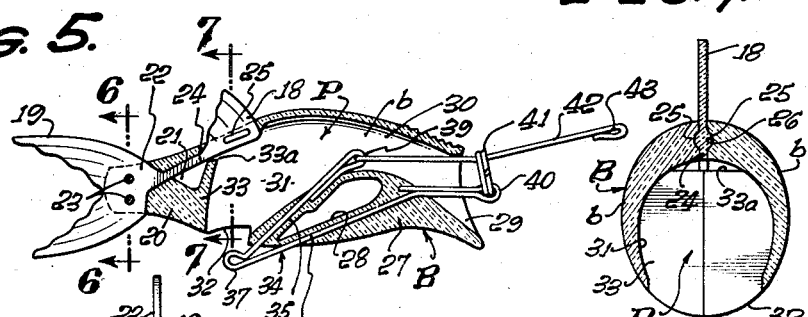
Fig. 5 is a view showing the lure in central longitudinal section, the hook being omitted.
Figure 6:
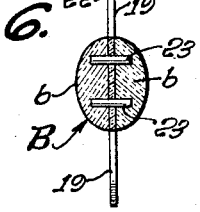
Fig. 6 is an enlarged vertical sectional view taken on the line 6—6 of Fig. 5.
Figure 7:
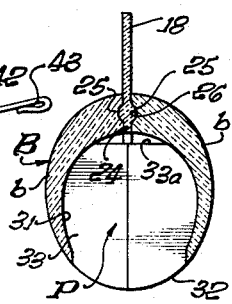
Fig. 7 is an enlarged vertical sectional view taken on the line 7—7 of Fig. 5.

As shown in Fig. 5 the body sections $b$, $b$, are so constructed that when secured one to the other they form a solid tail portion 20 having in its upper side a pocket 21. The fins 18 and 19 are flexible and constructed of extremely thin plastic, the fins 19 being formed on one end of a thin plastic plate 22 secured between the sections $b$, $b$, by pins 23, and the fin 18 being formed on one end of a strip 24 integral with the plate and extending through the pocket 21. The fin 18 is secured between the sections $b$, $b$, by forming tongues 25 on opposite sides thereof which seat in grooves 26 in the sections as best shown in Fig. 7.

The ventral portion 27 of the lure body is, with the exception of a sealed air chamber 28, solid and of anticlinal form in longitudinal section, its upper side providing the bottom wall of a passage P. This passage has as its entrance end 29 the open mouth of the body B, and, as illustrated, the face of such end is of ovate form and slanted upwardly and rearwardly and of concave curvature. This entrance end 29 leads to an upwardly curved portion which is relatively narrow in cross section or diameter to provide a constricted passage portion 30. At its rear end this constricted portion 30 merges into a portion 31 of larger diameter that is curved upwardly and then abruptly downwardly, narrowing as it proceeds to an opening 32 in the bottom of the body. This opening 32 is situated between the solid portions 20 and 27 and constitutes the exit end of the passage. It will be noted that this exit end is relatively small in cross section as compared to the entrance end 29.

The front side of the solid portion 20 provides a wall 33 which, while slightly concave, is substantially perpendicular to the major axis of the lure body to function in a manner to be later described herein. At the upper end of the wall 33 an orifice 33a is formed therein which provides communication between the pocket 21 and the passage P.

For mounting a hook on the lower side of the lure body and preferably at a point just ahead of the exit end or opening 32, and also to connect the lure to a fishing line so that where trolled the lure is free to describe a sinuous lateral motion, the following structure is provided. A single length of wire is bent to form a V-shaped mounting member 34, the legs 35 and 36 of which are partly embedded in the solid portion 27. The bight portion of the member is bent to form an eye 37 which projects from the bottom side of the body adjacent the exit opening 32, and to this eye is connected a hook 38 preferably formed with triple prongs.

The upper leg 35 at its upper end is bent upon itself to form an eye 39 which projects into the passage P. The lower leg 36 is also bent upon itself at its upper end to form an eye 40 which projects from the mouth of the body, and carries a wire ring 41. A connecting member 42 in the form of a short length of wire is pivotally connected at its rear end to the eye 39, extended forwardly through the ring 41, and formed with an eye 43 at its forward end for connection to a leader (not shown) of a fishing line.

In practice, when casting the lure it first sinks a short distance into the water, then rises to the surface with the mouth or entrance end 29 uppermost where it remains for a few seconds, and finally sinks beneath the surface. The lure initially sinks because of the force exerted thereon in casting, and as it sinks the air is trapped in the passage P by the water, and this air combined with the buoyancy provided by the air chamber 28, causes the lure, with its mouth uppermost, to rise to the surface of the water.

Subsequent sinking of the lure is delayed because the trapped air is retarded in its expulsion from the end 29 of the passage, since the water slowly enters the opening 32 by virtue of its small size, and slowly flows from the opening 29 because of the constricted passage portion 30. Air is also expelled through the orifice 33a, but relatively slow because of its small size. The air expelled from the opening 29 produces relatively large bubbles which, as they rise to the surface of the water, simulate breathing of a fish, and, hence, add to the luring property of the lure. The air emitted from the orifice 33a produces a series of small bubbles which serve to further attract fish to the lure. All in all the rising and sinking movements of the lure, and the air bubbles emitted therefrom simulates a fish rising to the surface for additional oxygen, and thus greatly aids in the catching of fish and particularly fresh water fish.

When trolling the lure the weight of the hook 38 maintains the lure righted, so that under pull of the fishing line the lure travels substantially horizontally in the water. As a result water is caused to flow into the entrance end 29 of the passage and outwardly through the exit end 32. By reason of the constricted portion 30, the wall 33 against which the water impinges, the relatively small outlet opening 32, and the longitudinal curvature of the passage as a whole, a resistance is offered to the flow of water through the passage which operates to swing the lure from side to side defining a sinuous lateral path in simulation of the swimming movements of a fish of commensurate size swimming at a comparable speed. This motion of the lure coupled with its almost exact form of a fish, produces a lure superior to previous lures in its ability to attract fish.

Although I have herein shown and described only one form of fish lure embodying my invention, it is to be understood that various changes and modifications may be made herein without departing from the spirit of my invention and the spirit and scope of the appended claims.

What I claim is:

1. A fish lure, including: a body having the exterior form of a fish, and a passage therein having an entrance end in the mouth of the body of an area corresponding to the fully opened mouth of a fish of commensurate body size, and an exit end in the ventral portion of the body, the passage extending upwardly and rearwardly from the entrance end, and then abruptly downward to the exit end resulting in the body having a wall substantially perpendicular to the major axis of the body, the ventral portion of the body ahead of the exit end of the passage being provided with a sealed air chamber and the body being provided with a pocket rearwardly of said wall and communicating with the passage at the top of said wall.

2. A fish lure, including: a body having the exterior form of a fish, said body being provided with a passage therein continuously curved vertically from end to end and having a relatively large entrance end in the mouth of the body the face of which is of concave form vertically, the passage to the rear of the entrance end being constricted for a distance whence it merges into an enlarged portion and then into a constricted portion that leads to an exit end in the bottom of the body of smaller area than the entrance end.

3. A fish lure as embodied in claim 2, wherein the body is formed with a sealed air chamber at the lower side of the passage and between the ends thereof, the dorsal side of the caudal portion of the body being provided with a pocket, and an orifice in the body connecting the pocket with the passage.

4. A fish lure, including: a body of elongated form having a tubular passage therein leading from the front end of the body to the bottom thereof, said passage having a portion curved upwardly from the front end on one radius to a second portion curved downwardly to the body bottom on another radius, said second portion first increasing in diameter rearwardly and then decreasing in diameter as it approaches the body bottom.

5. A fish lure, including: a body of elongated form having a tubular passage therein leading from the front end of the body to the bottom thereof, said passage having a portion curved upwardly from the front end on one radius to a second portion curved downwardly to the body bottom on another radius, said second portion first increasing in diameter rearwardly and then decreasing in diameter as it approaches the body bottom, said second portion of a shape to provide a rear wall which is substantially perpendicular to the major axis of the body.

6. A fish lure, including: a body of elongated form having a tubular passage thereon leading from the front end of the body to the bottom thereof, said passage having a portion curved upwardly from the front end on one radius to a second portion curved downwardly to the body bottom on another radius, said second portion first increasing in diameter rearwardly and then decreasing in diameter as it approaches the body bottom, said passage at the front end of the body enlarged, of ovate form, inclined upwardly and rearwardly, and of concave curvature vertically.

7. A fish lure as embodied in claim 6, wherein said passage at the front end of the body is of enlarged, ovate form, inclined upwardly and rearwardly, and of concave curvature vertically.

8. A fish lure as embodied in claim 6 wherein the upper wall of said passage is, at a point directly above the rear wall, formed with an orifice leading to the top side of the body.

References Cited in the file of this patent
UNITED STATES PATENTS

| | | |
|---|---|---|
| 1,597,703 | Young | Aug. 31, 1926 |
| 2,027,069 | Sorenson | Jan. 7, 1936 |
| 2,112,901 | Anderson | Apr. 5, 1938 |
| 2,538,459 | Kasmeyer | Jan. 16, 1951 |
| 2,556,683 | Deitz | June 12, 1951 |
| 2,556,702 | Nielsen | June 12, 1951 |
| 2,569,465 | Farr | Oct. 2, 1951 |
| 2,589,970 | Shahan | Mar. 18, 1952 |